United States Patent [19]

Pann et al.

[11] Patent Number: 4,594,693
[45] Date of Patent: Jun. 10, 1986

[54] SEISMIC TRACE INTERPOLATION USING F-K FILTERING

[75] Inventors: Keh Pann, Richardson; Jerry L. Fields, Plano, both of Tex.

[73] Assignee: Mobil Oil Corporation, New York, N.Y.

[21] Appl. No.: 548,901

[22] Filed: Nov. 4, 1983

[51] Int. Cl.⁴ .............................................. G01V 1/00
[52] U.S. Cl. ...................................... 367/43; 367/45; 367/47
[58] Field of Search ..................... 364/421; 367/43, 46, 367/49, 63, 74, 45, 47

[56] References Cited

U.S. PATENT DOCUMENTS

| | | | |
|---|---|---|---|
| 3,274,541 | 9/1966 | Embree | 367/46 X |
| 3,284,763 | 11/1966 | Burg et al. | 367/45 X |
| 3,550,073 | 12/1970 | Foster et al. | 367/43 X |
| 4,218,765 | 8/1980 | Kinkade | 367/49 |
| 4,380,059 | 4/1983 | Ruehle | 367/46 |

OTHER PUBLICATIONS

Sheriff, R. E., Encyclopedic Dictionary of Exploration Geophysics, Society Exploration Geophysicist, 1974, pp. 4, 189.

*Primary Examiner*—Charles T. Jordan
*Assistant Examiner*—Brian S. Steinberger
*Attorney, Agent, or Firm*—Alexander J. McKillop; Michael G. Gilman; Charles J. Speciale

[57] ABSTRACT

In seismic exploration, aliasing caused by coarse sampling along a line of exploration is corrected by trace interpolation. The interpolated traces are obtained by inserting zero amplitude traces between seismic traces. Transformation into the f-k domain and filtering of the aliased regions in the f-k domain produces properly interpolated traces when transformed to the x-t domain.

7 Claims, 28 Drawing Figures

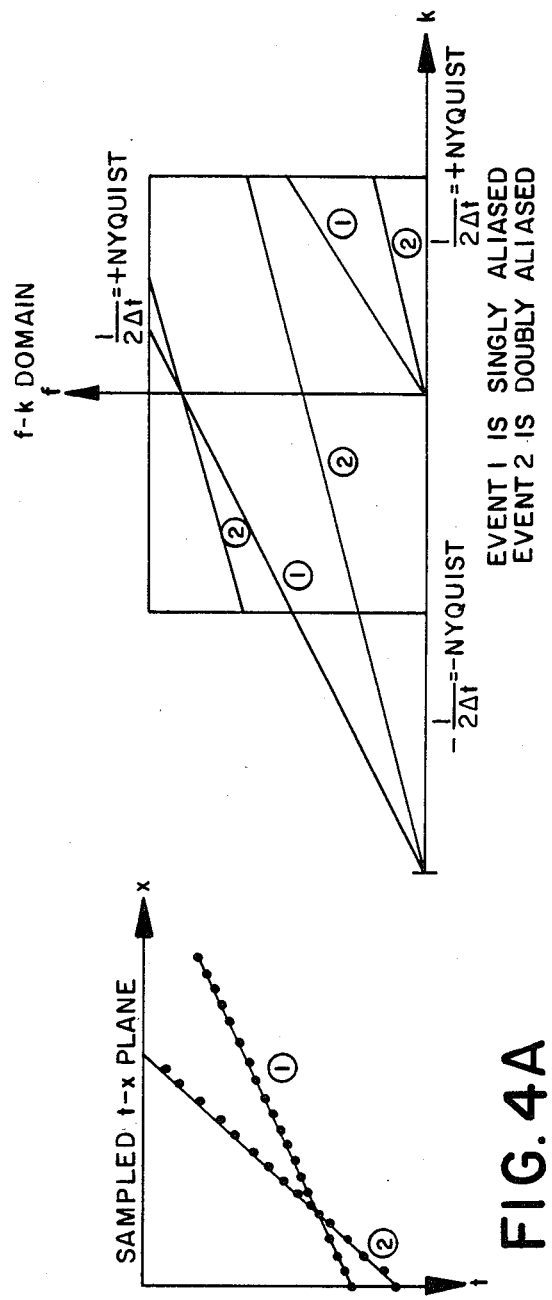

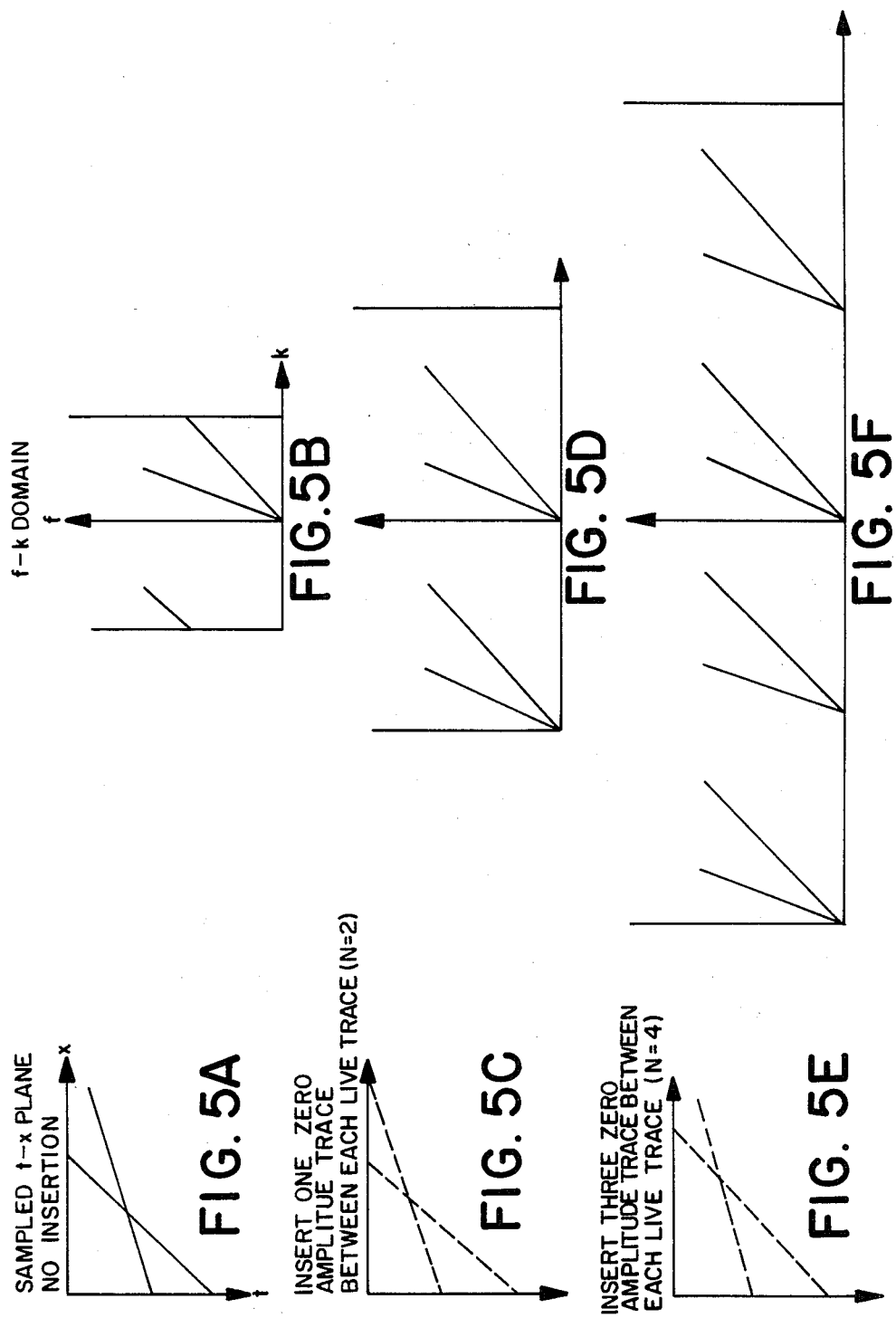

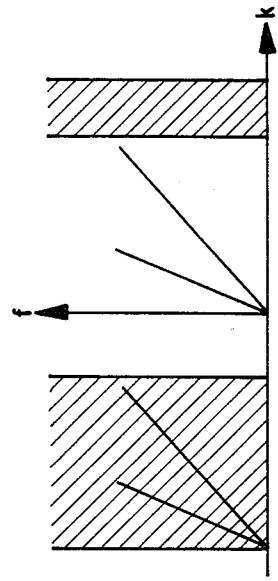
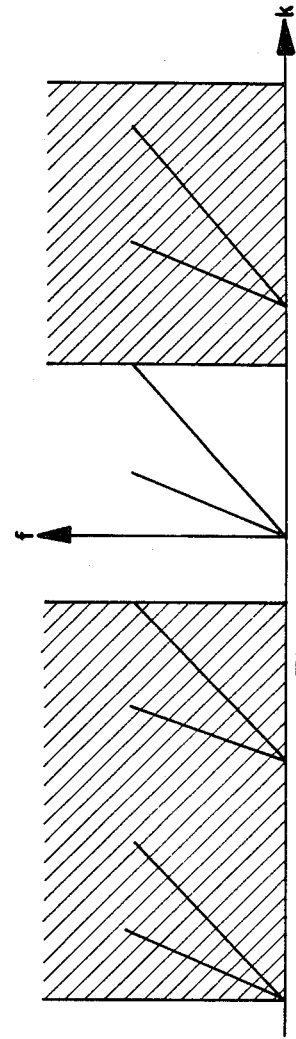
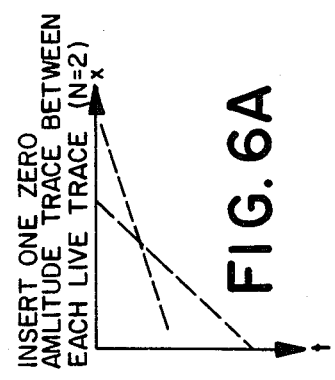
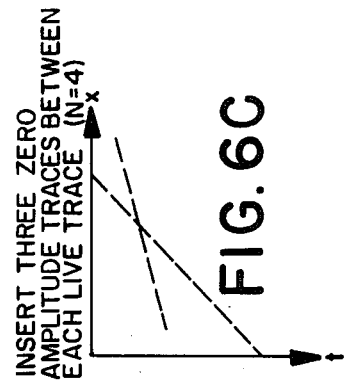

SEISMIC TRACE INTERPOLATION USING F-K FILTERING

BACKGROUND OF THE INVENTION

This invention relates to seismic exploration and more particulary, to a method for correctly interpolating seismic traces that are spatially aliased.

Seismograms are commonly recorded as digital samples representing the amplitude of a received seismic signal as a function of time. Since seismograms are usually obtained along a line of exploration on the surface of the earth, the digital samples can be formed into x-t arrays with each sample in the array representing the amplitude of the seismic signal as a function of horizontal distance and time. When such arrays are visually reproduced, by plotting or the like, seismic sections are produced. A seismic section depicts the subsurface layering of a section of the earth. It is the principal tool which the geophysicist studies to determine the nature of the earth's subsurface formations. Before an array of seismic samples can be converted into a seismic section which can be interpreted by the geophysicist, the array must be extensively processed to remove noise and to make reflection events discernable.

One of the problems which is encountered, is that the recorded seismic traces may exhibit aliasing. Aliasing is caused by coarse sampling. If the seismic signals are not sampled sufficiently frequently, time aliasing is present and seismic signals will not contain the entire seismic frequency band. This is generally not a problem because proper sampling techniques and anti-aliasing filters can be used to prevent time domain aliasing. However, aliasing in the distance domain is not so easily prevented. Uniform sampling may be difficult to obtain in some marine and land surveys. Wind and water currents, physical obstacles, etc., cause abnormal shooting and recording geometries, resulting in irregularly spaced traces and gaps in coverage. Even in uniformly spaced data, the gathering of oblique lines required for interpretation for well ties may result in a large trace spacing, depending on the angle of the line in the survey grid.

Numerous seismic processes are critically dependent upon proper spatial sampling. Migration and velocity techniques are examples of processes which cannot be performed satisfactorily if spatial aliasing is a serious problem.

Spatial aliasing may be present when an insufficient number of seismic traces have been recorded along the line of exploration. Spatial aliasing is compensated for by interpolating between the seismic traces and inserting the interpolated trace into the seismic section. However, trace interpolation is much more difficult than it first appears. To properly interpolate between two seismic traces, it is necessary to find the mean or average amplitude at each increment of time. Even if this is done, there is no assurance that the interpolated trace has values which are within the frequency pass band of the recorded seismic traces.

It is an object of the present invention to provide a technique of quickly and correctly interpolating seismic traces which can be inserted into a seismic section to suppress spatial aliasing.

In the processing of seismograms, x-t arrays have been transformed into arrays representing amplitude as a function of frequency and wave number. This is commonly referred to as an "f-k" transformation. The f-k transformation has been used as a tool to study seismic filtering. U.S Pat. Nos. 3,284,763—Burg et al, and 3,274,541—Embree describe velocity filtering which is carried out in the time domain on digital seismograms. These patents describe a type of velocity filtering which is commonly referred to as "pie slice" because of the shape of the filtered region in the f-k transform of the seismic section. Embree and Burg, et al do not perform a filtering operation on the f-k section; all filtering is in the time domain on sections in the normal x-t arrays U.S. Pat. No. 3,550,073—Foster, et al is an improvement on "pie slice" filtering.

In U.S. Pat. No. 4,218,765—Kinkade, the seismic traces are transformed to f-k array and filtering is performed on the traces while they are in the f-k domain.

It is another object of the present invention to use f-k filtering techniques to interpolate seismic traces so that interpolated traces can be inserted into the seismic section to overcome spatial aliasing.

SUMMARY OF THE INVENTION

In accordance with the present invention, trace interpolation is carried out by inserting zero amplitude traces between the seismic traces in a section where spatial aliasing is a problem. The traces are then transformed into an f-k array. The f-k array is filtered with a filter which rejects samples in a region of frequency and wave number which exhibits aliasing. The filtered f-k array is then transformed back into a seismic section representing amplitude as a function of time and distance. In accordance with the present invention, the inserted traces are accurately interpolated in this manner. Therefore, the interpolation can be carried out quickly and expediently with efficient usage of computer time.

Further in accordance with the present invention, the total energy of the f-k array is scaled up by the factor of the interpolation ratio of zero amplitude traces to seismic traces. This maintains the amplitude of the filtered traces so that they match the amplitude of the input traces.

The foregoing and other objects, features and advantages of the invention will be better understood from the following more detailed description and appended claims.

SHORT DESCRIPTION OF THE DRAWINGS

FIGS. 4A and 4B depict spatial aliasing;

FIGS. 5A–5F depict the effects of inserting zero amplitude traces;

FIGS. 6A–6B depict the f-k region which is to be filtered out in an example in which one zero amplitude trace is inserted between each live trace;

FIGS. 6C and 6D depict the f-k regions to be filtered out where three zero amplitude traces are inserted between each live trace;

DESCRIPTION OF THE PREFERRED EMBODIMENT

Figure 1:
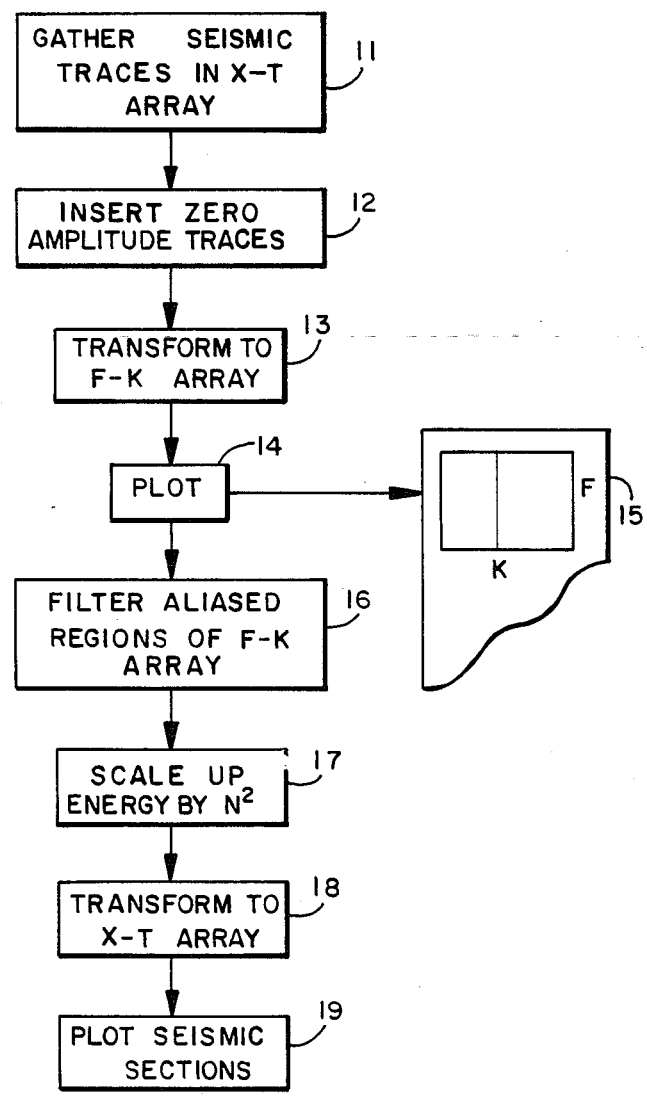
FIG. 1 is a flow sheet depicting the invention.

Before describing the invention which is depicted in FIG. 1, the aliasing of seismic traces as a result of coarse sampling will be described with reference to FIGS. 2–4. FIG. 2A depicts seismic traces representing the amplitude of seismic reflections as a function of time and distance along a line of exploration in the x direction on the earth's surface. These traces have been gathered into an x-t array, commonly referred to as a "seismic section." FIG. 2A depicts two reflection horizons in the subsurface of the earth. The second horizon is more deeply dipping than the first. When a series of seismograms are obtained along a line of exploration in the x direction on the earth's surface, the reflection horizons will be sampled as indicated by the dots in FIG. 3A. These samples have a sample interval of $\Delta t$ in the t direction and a sample interval of $\Delta x$ in the x direction.

Figure 2B:
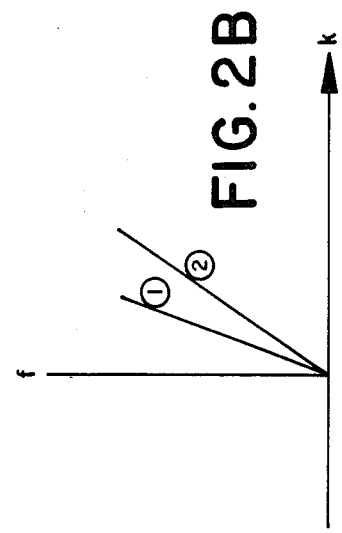
FIG. 2A depicts an x-t array and FIG. 2B is its f-k transform.
Figure 3B:
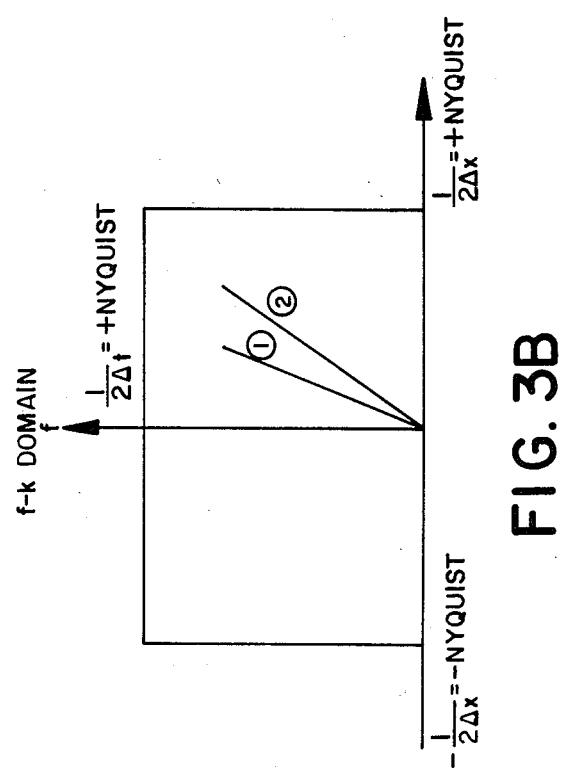
FIGS. 3A and 3B depict the effects of sampling in the t-x domain.
Figure 2A:
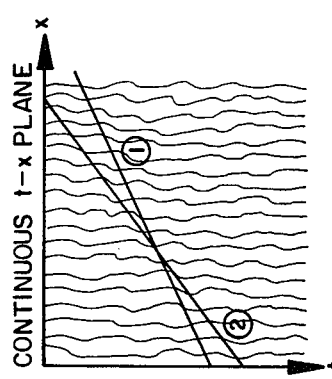
Figure 3A:
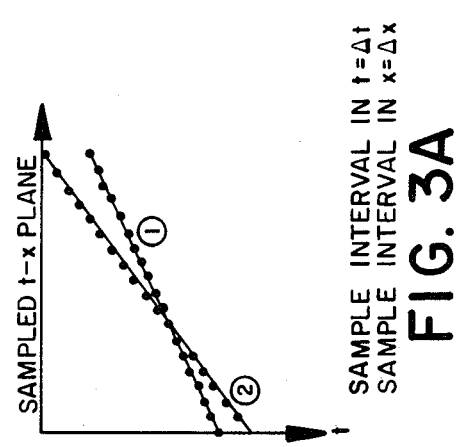
Figure 7:
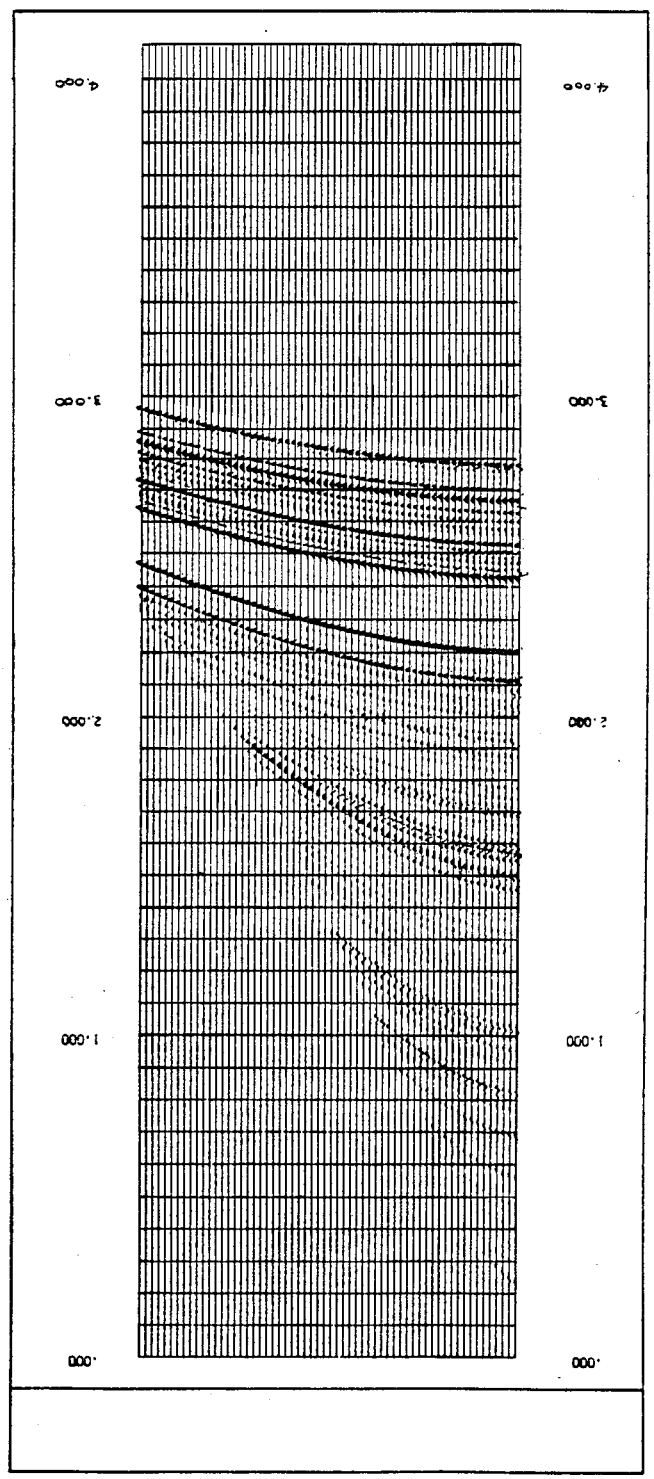
FIG. 7 depicts a model CDP record.
Figure 8:
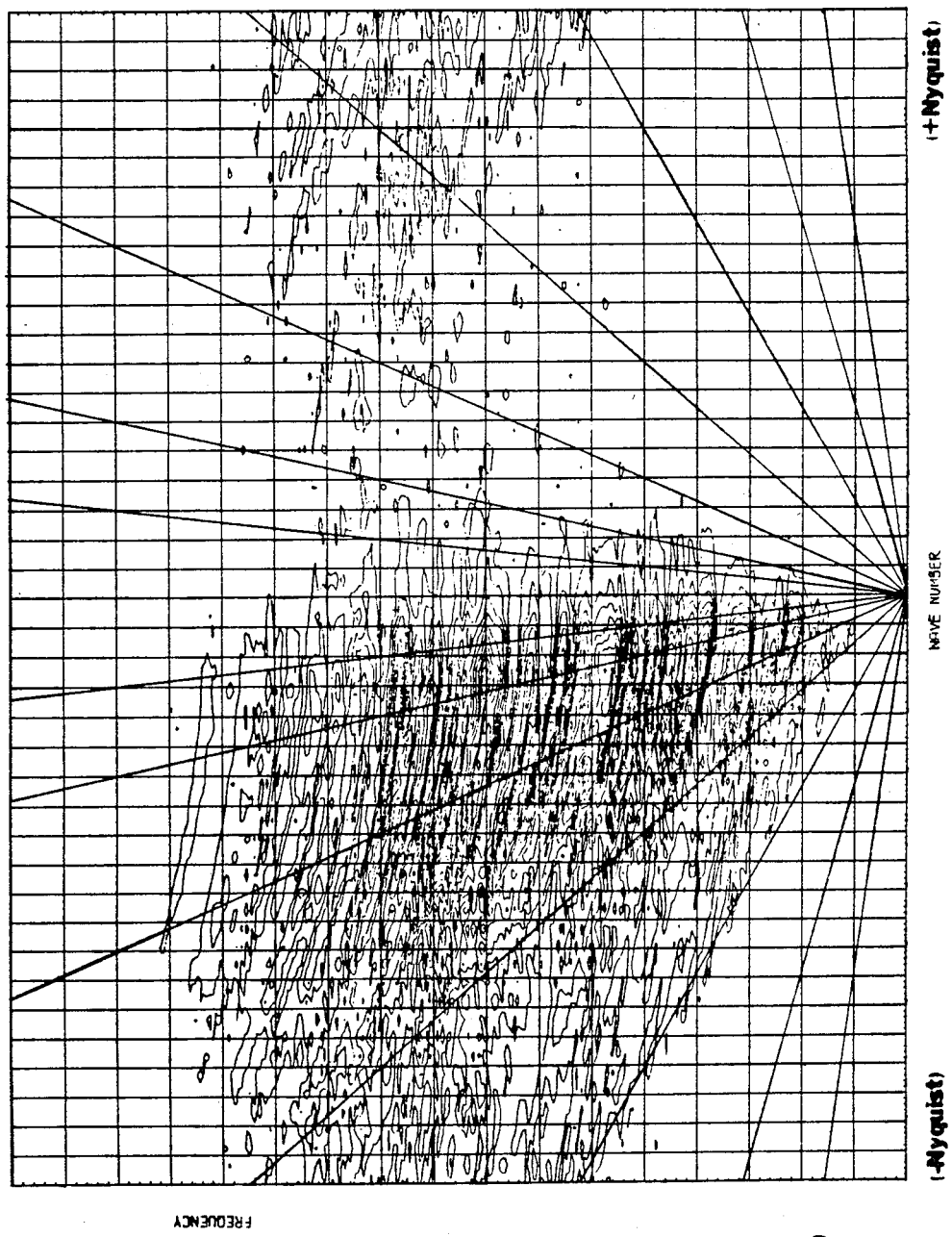
FIG. 8 depicts the f-k plot of the model CDP record.

Sampling effects of the two-dimensional spectrum are illustrated in FIGS. 2B and 3B which depict the f-k transforms of the x-t arrays of FIG. 2A and FIG. 3A. FIG. 2B illustrates the spectrum associated with a continuous band pass signal dipping in the continuous t-x domain and FIG. 3B illustrates the corresponding spectrum when the t-x domain is sampled. A large sampling interval in the t-x domain corresponds to a small Nyquist frequency and Nyquist wave number in the f-k domain. For a given signal in the continuous t-x domain, too large a sampling interval will make the spectrum of the basic cell contaminated by the spectrum generated from its neighboring cells. This phenomenon is referred to as aliasing. Aliasing in the time domain is usually protected at the data acquisition stage by using an anti-aliasing filter before the analog seismic signal is digitized, whereas aliasing in the spatial domain is not protected.

One spectrum represented in FIG. 3B is not aliased. However, a spectrum of spatially aliased signals is illustrated in FIG. 4B, where Event 1 is singly aliased and Event 2 is doubly aliased. Here, following a frequently used convention, only the upper half $f>0$, of the basic cell is shown in the display.

The present invention provides a technique of compensating for this aliasing so that coarsely sampled seismic traces can be used in seismic processing which requires nonaliased input traces. The present invention is not a substitute for proper data gathering, but is a technique which can be used when it is not possible to obtain properly sampled seismic traces.

FIG. 1, in the step indicated at 11, indicates the gathering of seismic traces in an x-t array such as that depicted in FIG. 2A. In accordance with the invention, zero amplitude traces are inserted between the seismic traces, as indicated at 12. As many zero amplitude traces are inserted as are required to provide proper sampling in the x direction. As will be subsequently described, one zero amplitude trace can be inserted between input data traces, i.e., $N=2$, two traces can be inserted between input data traces, $N=3$; or three traces can be inserted between each input data trace, $N=4$. In the foregoing, N is the interpolation ratio of total traces after insertion to live data traces before insertion.

The traces are transformed into an f-k array of samples representing amplitude as a function of frequency and wave number as indicated at 13.

The effects of inserting zero amplitude traces are shown in FIGS. 5A–5F. Because the spectrum at any point of the f-k domain is a weighted linear combination of the input data samples, the spectrum will not be changed by the insertion of any number of zero amplitude traces. It follows that the spectrum stays the same as before even after the data set has been inserted with many zero amplitude traces. The Nyquist wave number, however, is enlarged by the factor N. FIG. 5 demonstrates this characteristic. FIG. 5B shows the spectrum as well as the basic cell associated with the original data set and FIG. 5D shows the corresponding display after zero amplitude traces have been inserted for $N=2$. FIG. 5F repeats the display for the case $N=4$.

In FIG. 1, step 14 indicates the plotting of the f-k arrays which step produces the plots 15, such as those shown in FIGS. 5D and 5F.

In accordance with the present invention, the aliased regions of the f-k array are filtered out, this step being indicated at 16 in FIG. 1. The function of f-k domain filtering is to mute the aliased, or "artifacts", region of the spectrum in the now enlarged basic cell.

Using the example of FIGS. 5D and 5F, the mute regions are illustrated in FIG. 6B for $N=2$ and in FIG. 6D for $N=4$. After the mute, the spectrum has the appearance of a set of radial lines. In other words, the filtered signal, when represented in the t-x domain, is now a linear combination of dipping events, which is exactly what is desired by interpolation. Note also from FIGS. 6B and 6D that the original aliased event is no longer aliased after interpolation.

The illustrated f-k muting process does not preserve input seismic amplitude. In fact, it reduces the total energy by a factor N, the interpolation ratio. The total energy of a data set can be computed either in the t-x domain, by summing the squares of the amplitude at all the t-x grids or, in the f-k domain, by summing over the squares of the absolute amplitude at all the f-k grids. This property is usually known as the Parseval's Theorem.

To recover the true amplitude of the data trace and the additional inserted zero amplitude trace, the total energy of the filtered traces should increase by the factor N. Thus, to restore the true amplitude, the total energy of the f-k domain muted data should be scaled up by a factor $N^2$, which corresponds to scaling the amplitude of the f-k domain filtered output traces by a factor N. This scaling is carried out in step 17.

The interpolated, filtered, f-k array is transformed to an x-t array as indicated at 18 and the seismic sections are plotted as indicated at 19.

Figure 9:
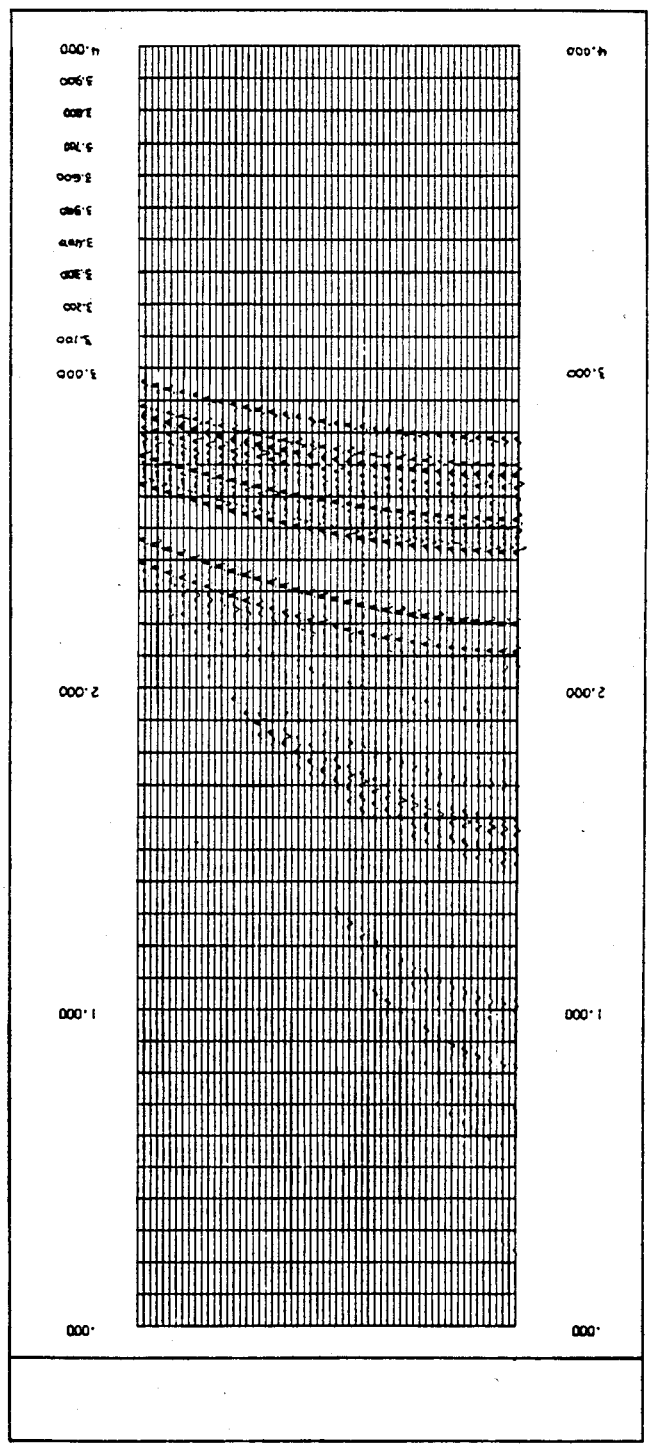
FIG. 9 depicts the CDP record with one zero trace inserted between each input data trace.
Figure 10:
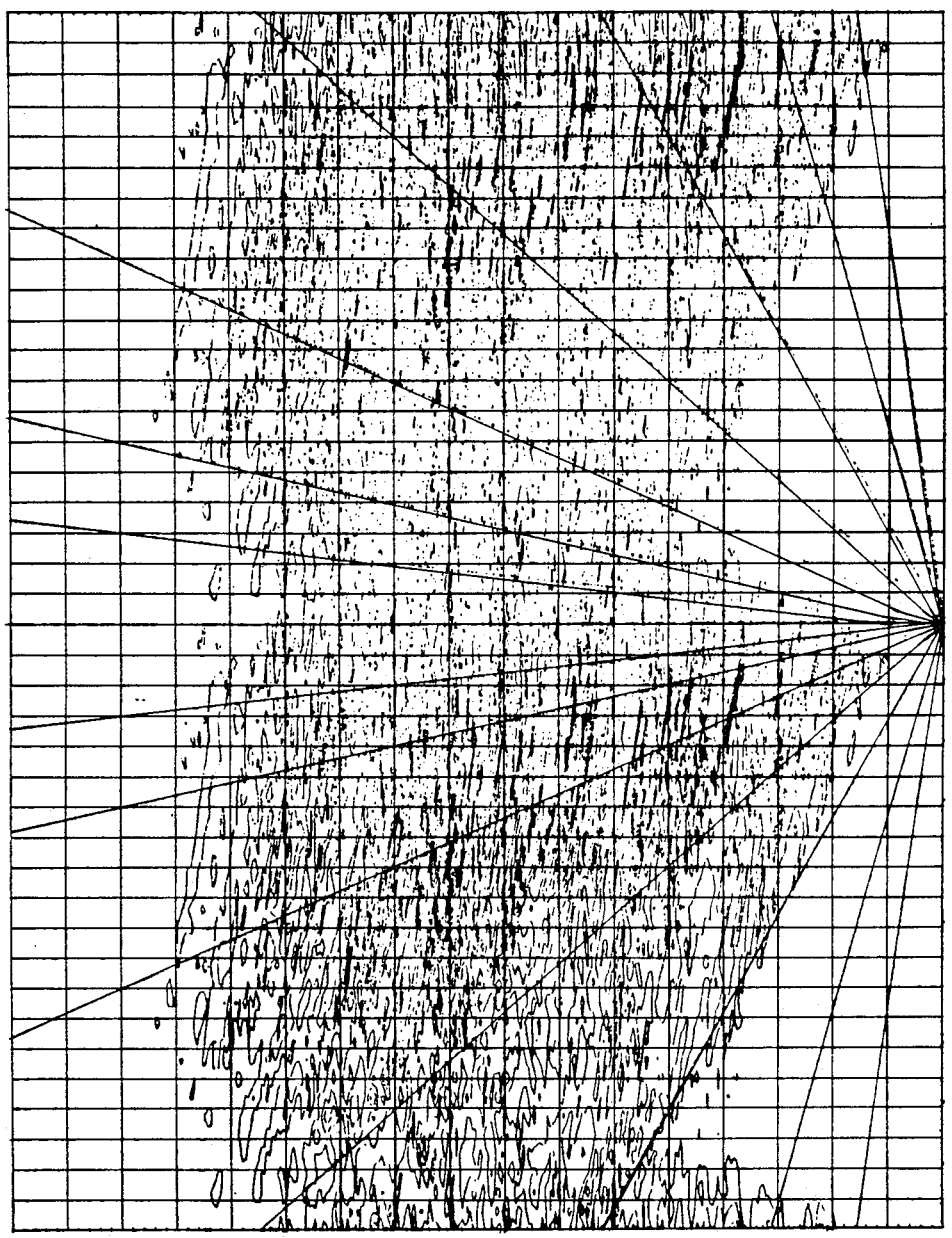
FIG. 10 shows the f-k plot of the record of FIG. 9.
Figure 11:
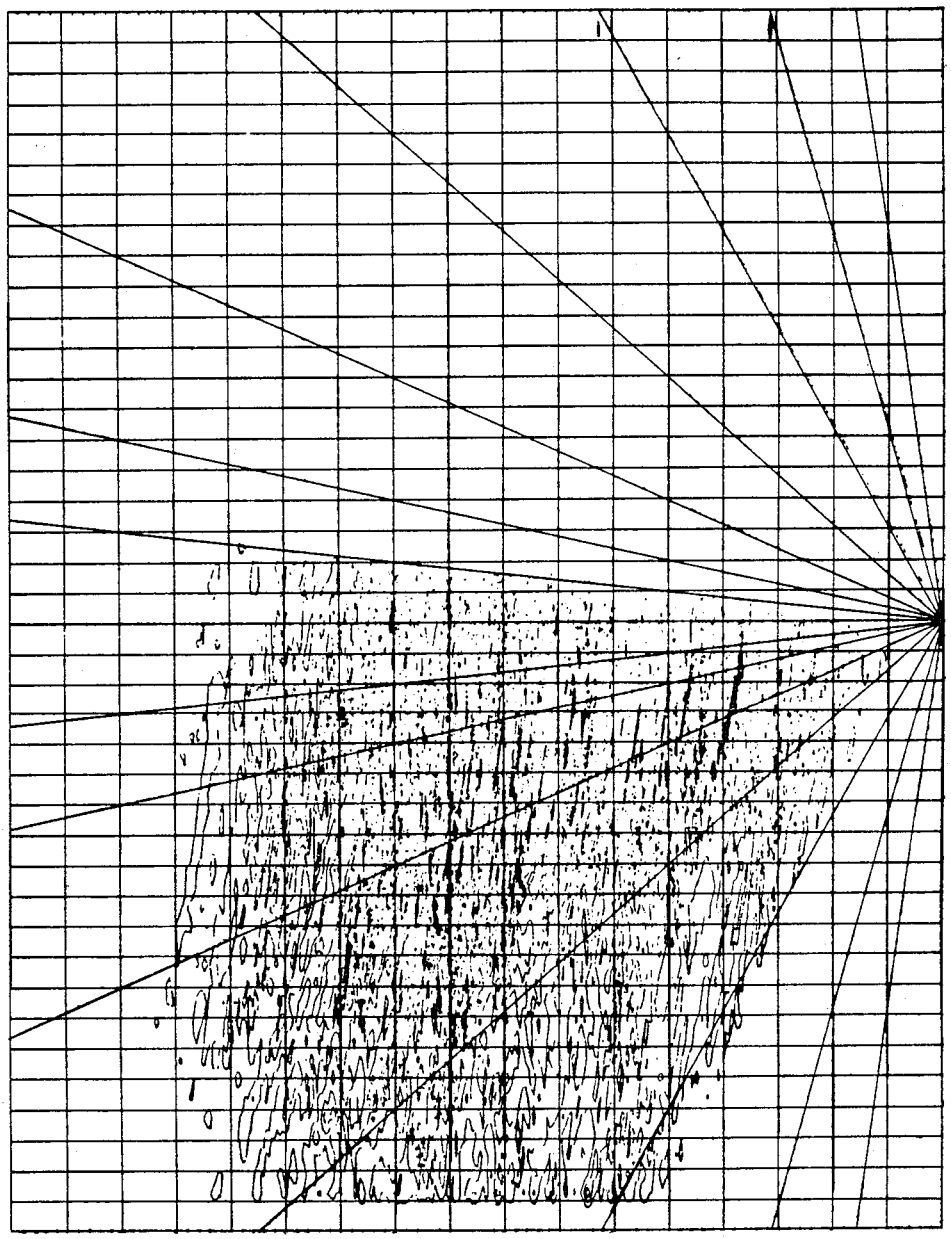
FIG. 11 depicts the f-k plot of FIG. 10 wherein the aliased regions have been filtered out.
Figure 12:
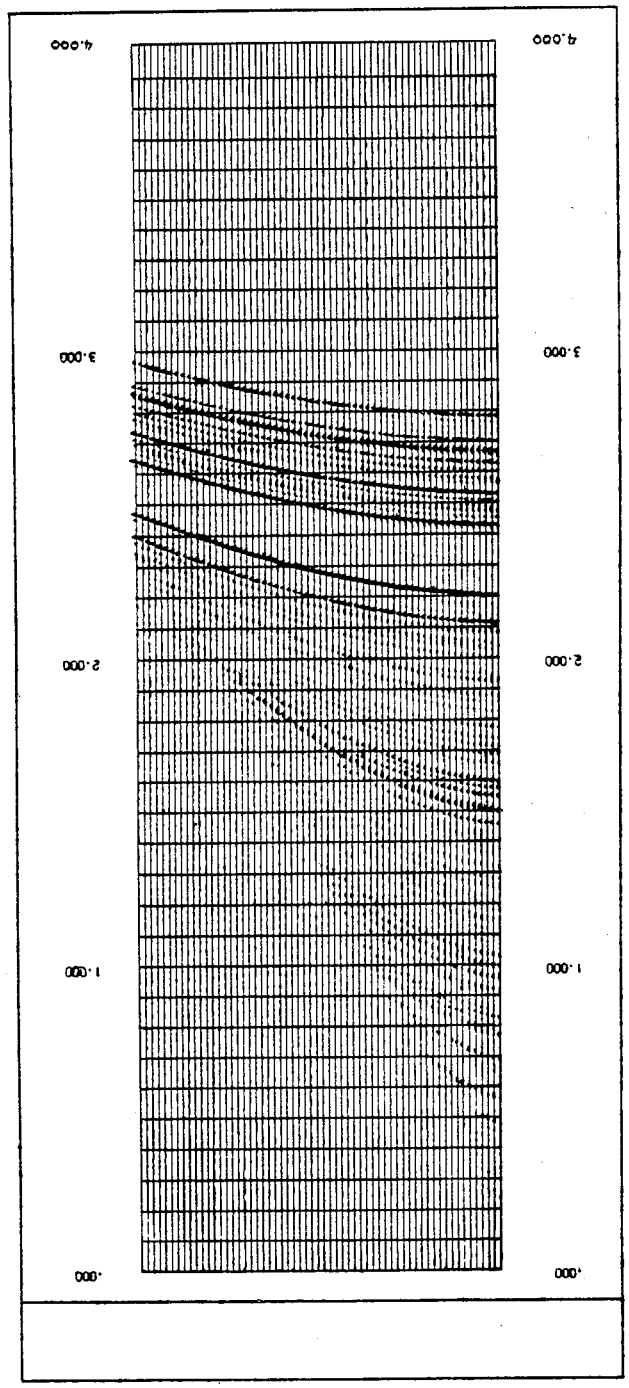
FIG. 12 depicts the record of FIG. 11 transformed back to the x-t domain.
Figure 13:
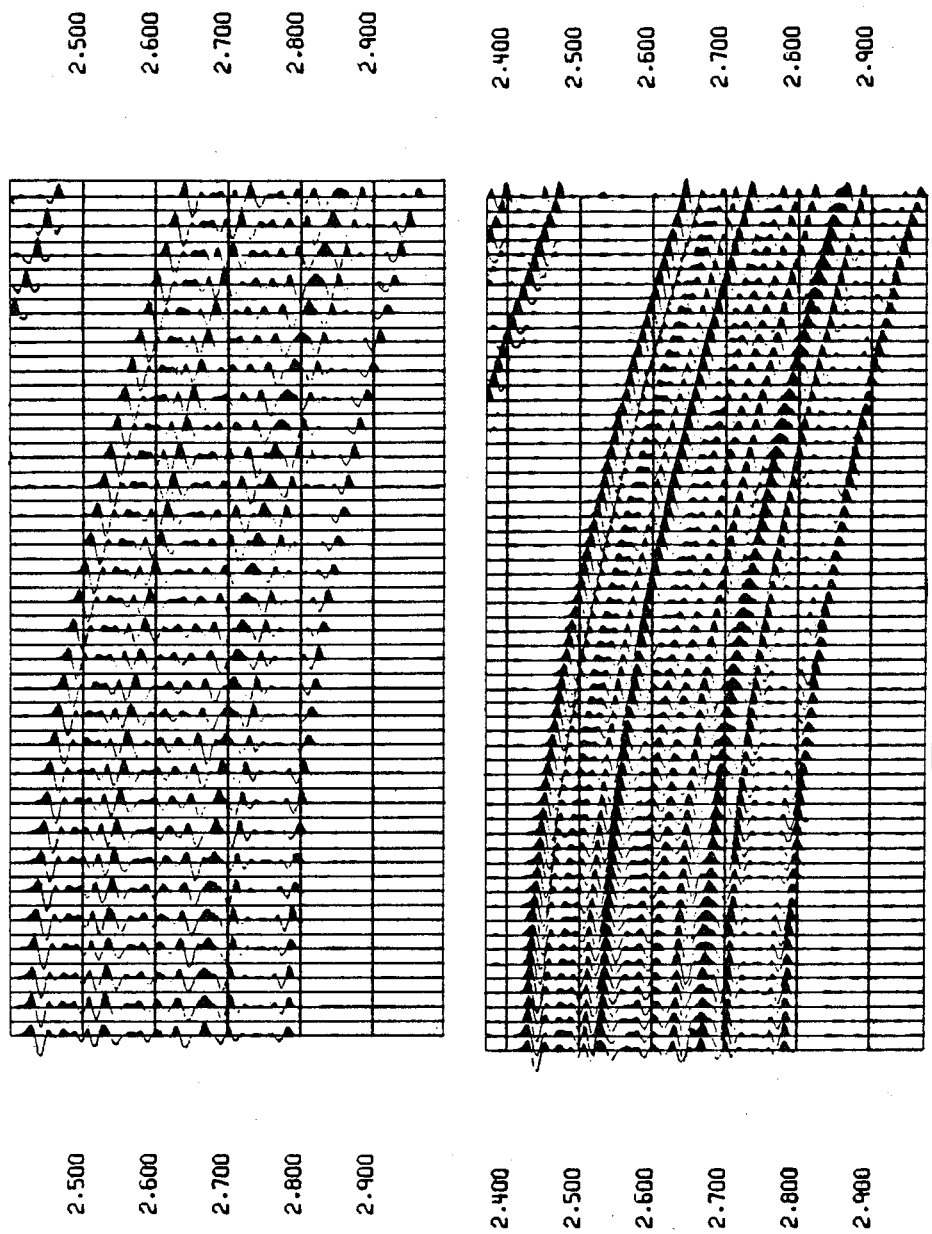
FIG. 13 shows portions of FIG. 12 and portions of FIG. 9.

In order to better illustrate applicant's invention, several examples of practice of the invention on model records and on actual field data are given. FIGS. 9 and 10 show the record and its f-k plot after every other trace has been zeroed. Note that although the Nyquist wave number is the same, the f-k spectrum is aliased for positive k numbers. FIG. 11 shows the aliased region muted by filtering. When the aliased portion is removed with an appropriate f-k filter and then inverse transformed, the record contains all live traces (FIG. 12). An enlarged portion of the model record is shown at the top of FIG. 13 before interpolation. This same portion is shown at the bottom of FIG. 13 after interpolation and filtering. This reveals that the original traces retain their original character while the interpolated traces prove to be an excellent average of the adjacent traces.

Figure 14:
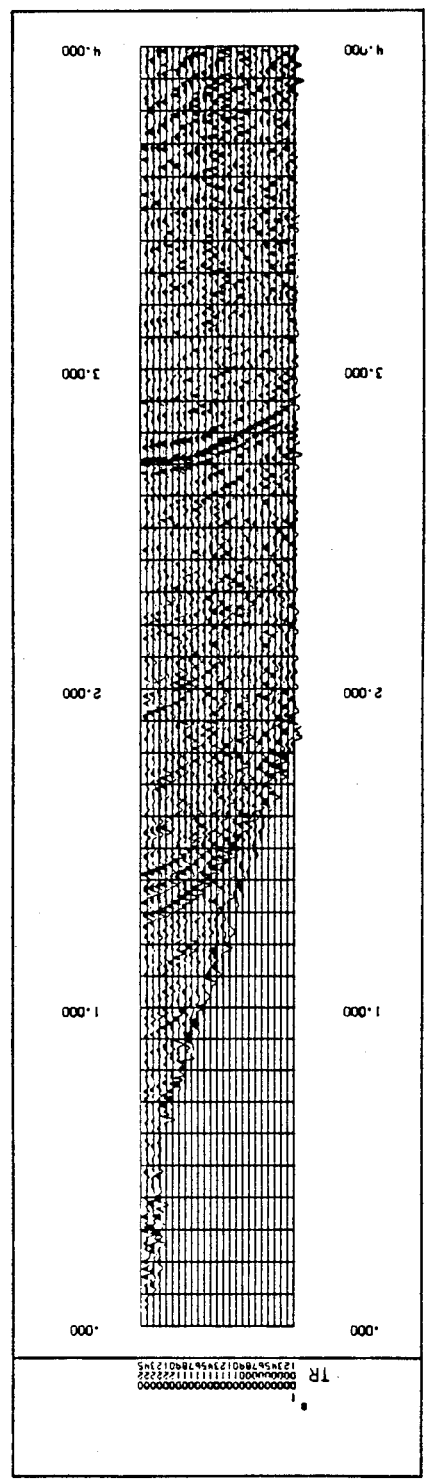
FIG. 14 depicts a field record before being processed in accordance with the present invention.
Figure 15:
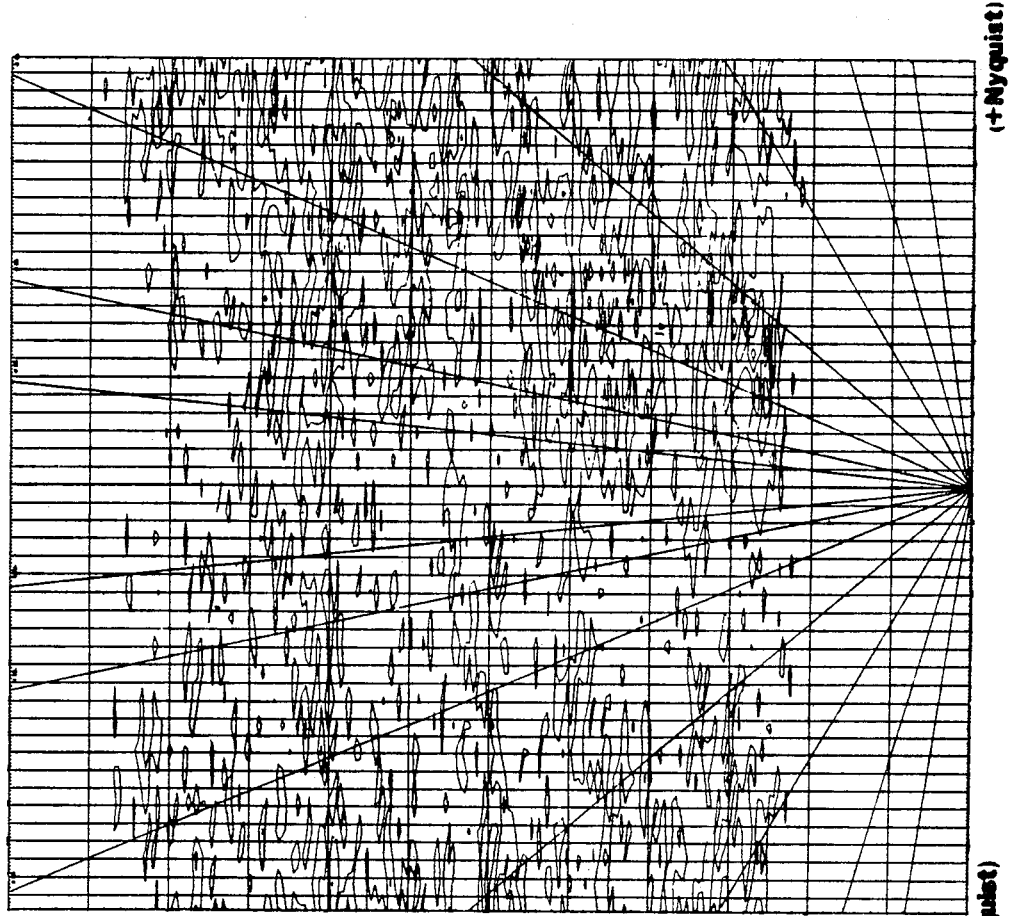
FIG. 15 shows the f-k plot of the field record of FIG. 14.
Figure 16:
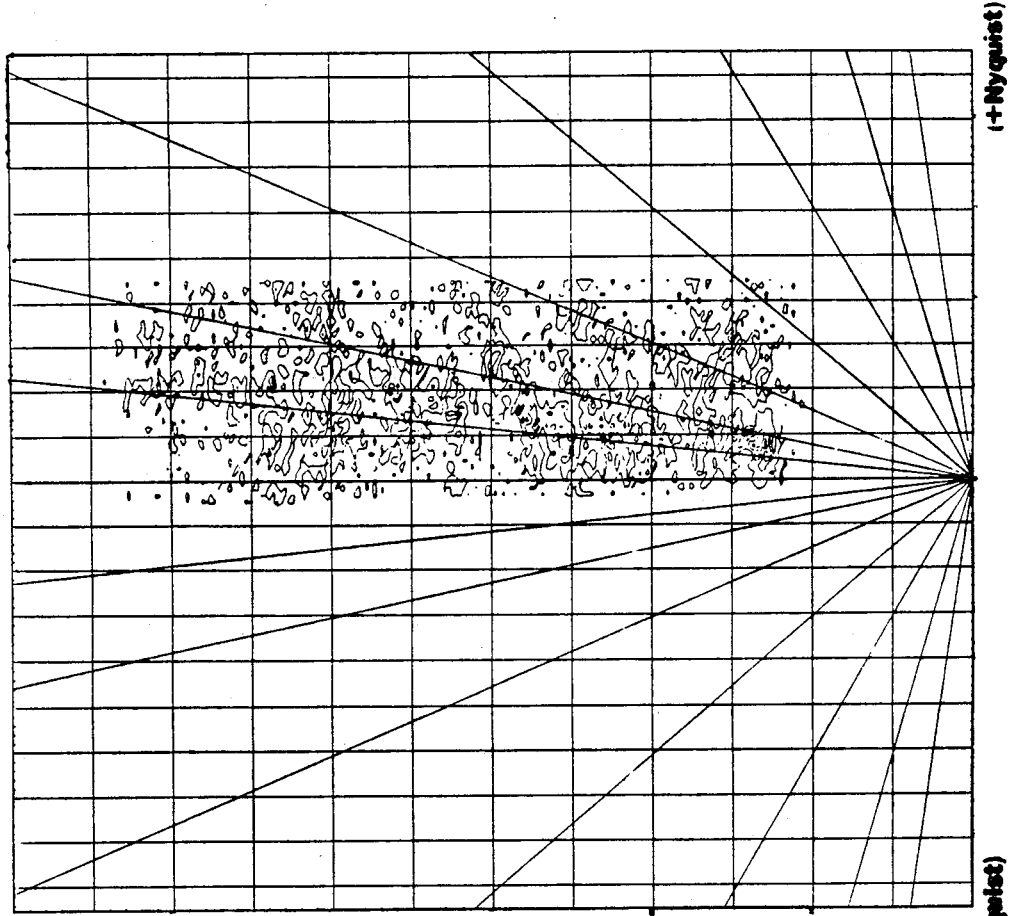
FIG. 16 shows the f-k plot of FIG. 15 after the aliased regions have been filtered.
Figure 17:
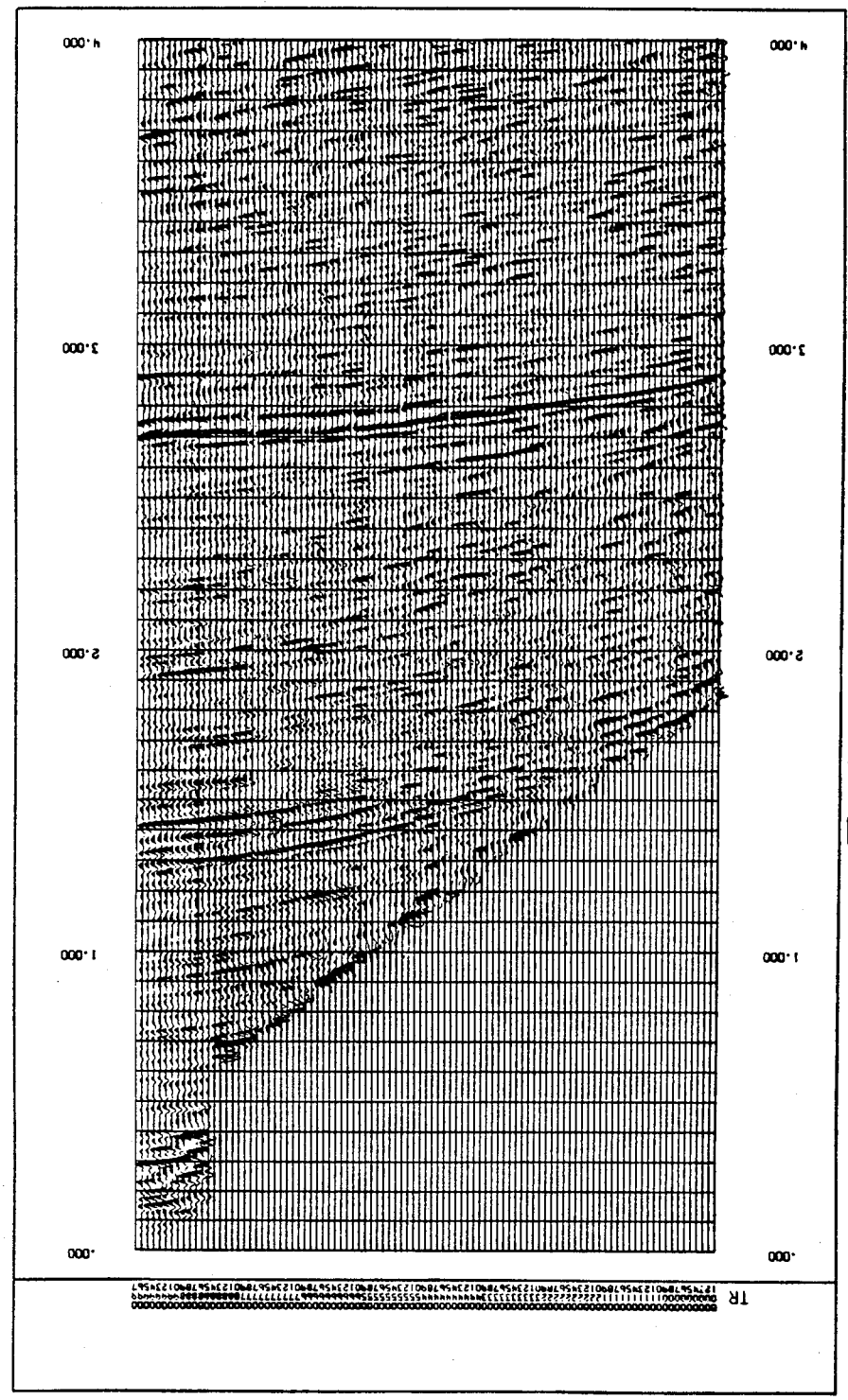
FIG. 17 depicts the field record of FIG. 14 after it has been processed in accordance with the present invention.

The practice of the invention on an actual field record is shown in FIGS. 14–16. A 25-trace field record with 420 ft. trace spacing shown in FIG. 14 was used since this would be a likely candidate for trace interpolation. The f-k plot is very difficult to interpret because of aliasing (FIG. 15); therefore, the f-k plot after inserting three traces between existing traces is not shown. Theory and experience with other examples indicates where the mute zone should be in the f-k domain. FIG. 16 shows the f-k plot after three zero amplitude traces have been inserted and the aliased region has been muted in the f-k domain. The interpolated result in FIG. 17 has a slightly mixed appearance due to the limited number of traces in the field record. The 97 traces were automatically padded to 128 traces (the next highest power of 2). By selecting parameters to force the transform to pad to 256 traces, a finer spatial sampling would result and the output would have less smear.

These examples clearly demonstrate that the f-k interpolation technique is very effective in maintaining the frequency content and character of the interpolated traces. Although the method requires that if the dip angles are significant most of the dip be primarily in one direction, this is not a severe limitation for field records or CDP gathers. For stack data it is possible to break most lines up into segments each part having a predominant dip direction.

The present invention can be performed on existing seismic data processing equipment which has been programmed for f-k filtering.

The filtering of the f-k transforms, indicated by the step 16 in FIG. 1, is carried out by an operation which rejects, or zeroes, all samples of an array within a closed region. This can be done by multiplying all samples in the filtered region by zero. The conceptual listing of one computer program for carrying out this operation is given below.

```
PARAMETER LIST, X, X, NT, TO, TL, X1
SEISDATA (FIRST, LAST, T1, T2, FILE1, FILE2)
PAD TRACES (STARTNO, VALUE1, ENDNO,
    VALUE2)
PAD TIME (TSTARTN, TVALUE1, TENDN,
    TVALUE2)
TRANSFORM TIME (FILE2, FILE3, FILE4,
    START, STOP)
MULTIPLEX (FILE3, FILE4, FIRST, LAST,
    REAL)
MULTIPLEX (FILE4, FILE5, FIRST, LAST, IM)
TRANSFORM SPACE (FILE5, FILE6, FILE7,
    FILE8, START, STOP)
PLOT FK (X, T, f, K, LEVELS, KEY, FILE7,
    FILE8)
FILTER (FR FI, ROW, COLUMN, KEY)
FILTER FK (FR, FI, FILE7, FILE8, FILE9,
    FILE10, KEY)
PLOT FK (X T, f, K, LEVELS, KEY FILE9,
    FILE10)
TRANSFORM K (FILE9, FILE10, FILE11, FILE12, STARTK, STOPK)
MULTIPLEX (FILE11, FILE12, FIRST, LAST,
    REAL)
MULTIPLEX (FILE12, FILE14, FIRST, LAST, IM)
TRANSFORM F (FILE13, FILE14, FILE15,
    START, STOP)
```

SEISDATA
  Takes data between trace FIRSTR and LASTR from FILE1 and loads in FILE2.
PAD TRACES
  Pads ENDNO and STARTNO of traces at ends of FILE1 of VALUE1 and VALUE2 usually zeros.
PAD TIME
  Pads time before and after TSTARTN and TENDN with values TVALUE1 and TVALUE2 respectively, usually zeroes.
TRANSFORM TIME
  Perform Fourier transform on fine data from FILE2 and puts real results into FILE3, imaginary into FILE4.
MULTIPLEX
  Reorganizes frequency sequential series of FILE3 and FILE4 into space sequential series in FILE5 and FILE6.
TRANSFORM SPACE
  Perform Fourier transform on space sequential series of FILES 5 and 6 with real results in FILE7, imaginary in FILE8.
PLOTFK
  Plots the fk transform.
FILTER
  Constructs weighting function FR and FI for real and imaginary series in fk space or by setting key will construct a filter to operate only the magnitude of fk transform. A second option is 1/FR+FI. Other options are possible.
FILTER FK
  Performs product of FR, FI elements of transform on FILES 7 and 8 with results on FILES 9 and 10. Key is used to signal option as in FILTER.
PLOT FK
  Plots resulted FILTER FK transform.
TRANSFORM K
  Performs Fourier transform on K sequential series of FILES 9 and 10 placing results in FILTERS 11 and 12.
MULTIPLEX
  Reorganizes space sequential series on FILTERS 13 and 14.
TRANSFORM F
  Performs Fourier transform of frequency sequential series on FILTER 13 and 14 with resulting time sequential series on FILE 15.

The result of the operation is a time space or frequency wave number filter operation on the input data section or record.

The foregoing is a Fortran listing of a series of subroutines, functions or modules. Each performs a series of operations in a modular form of processing.

In one working embodiment of the invention, the filtering operations were carried out on a Control Data Corporation computer system, model No. 175/760, having a 6600 CPU and CYPER 175 CPU, with the following peripheral equipment, CDC 6250 9 Track Tape Transporter, CDC MAP III Array Processor and CDC Extended Core Storage. The specifications for the system are:

Central Processor: 18 and 60 Bit Registers
Peripheral Processors: 12 Bit Registers
Extended Memory (ESC): 100K 60 Bit Words
Central Memory: 131K 60 Bit Words (6600) 262K 60 Bit Words (C175)
Array Processor: CDC MAP III
Mass Storage:
  16 Model 844-41
  348 Million Words
Tape Drives:
  2—7 track 556/800 BPI
  4—9 track 800/1600 BPI
  30—9 track 1600/6250 BPI
  2—21 track 356 BPI
Unit Record Equipment:
  2—model 405 card readers 1—model 415 card punch
  4—line printers The programming required to practice the invention will be apparent to those skilled in the art from the foregoing and from the users manual for the particular computer employed.

While a particular embodiment of the invention has been shown and described, various modifications are within the spirit and scope of the invention. The appended claims are, therefore, intended to cover all such modifications.

What is claimed is:

1. In seismic exploration of the earth's formations, the method of suppressing aliasing caused by coarse sampling along a line of exploration comprising:
   gathering seismic traces representing the amplitude of seismic reflections as a function of time and distance along said line of exploration;
   inserting zero amplitude traces between said seismic traces;
   transforming said traces into an f-k array of digital samples representing amplitude as a function of frequency and wave number;
   filtering said f-k array with a filter which mutes all samples in a region of frequency and wave number which has aliasing; and
   transforming the filtered f-k array into a seismic section representing amplitude as a function of time and distance.

2. The method recited in claim 1 further comprising: scaling the total energy of said f-k array up by a factor of the interpolation ratio of total traces after interpolation to input seismic traces.

3. The method recited in claim 2 wherein the ratio of total traces after interpolation to input seismic traces is denoted N, and wherein the step of scaling includes scaling the total energy of said f-k array up by a factor of $N^2$.

4. The method recited in claim 1 wherein the step of filtering includes multiplying all samples in said region which has aliasing by zero.

5. The method recited in claim 3 wherein one zero amplitude trace is inserted between each input seismic trace and wherein the total energy of said f-k array is scaled up by a factor of 4.

6. The method recited in claim 3 wherein two zero amplitude traces are inserted between each input seismic trace and wherein the total energy of said f-k array is scaled up by a factor of 9.

7. The method recited in claim 3 wherein three zero amplitude traces are inserted between each input seismic trace and wherein the total energy of said f-k array is scaled up by a factor of 16.

* * * * *